United States Patent [19]
Whalen, II

[11] Patent Number: 5,373,866
[45] Date of Patent: Dec. 20, 1994

[54] REFRIGERANT DISCHARGE PLIERS

[76] Inventor: John R. Whalen, II, 788 Devonshire Rd., Valparaiso, Ind. 46383

[21] Appl. No.: 198,295

[22] Filed: Feb. 18, 1994

[51] Int. Cl.$^5$ ............................................. F16L 41/04
[52] U.S. Cl. ...................................... 137/318; 222/5; 222/83
[58] Field of Search ............ 222/5, 80, 81, 83; 30/366; 137/318

[56] References Cited

U.S. PATENT DOCUMENTS

| | | | |
|---|---|---|---|
| 2,137,620 | 11/1938 | Meissner | 222/83 |
| 2,516,061 | 7/1950 | Lieb | 222/83 |
| 3,395,724 | 8/1968 | Hamel | 137/318 |
| 3,509,905 | 5/1970 | Mullins | 137/318 |
| 3,543,788 | 12/1970 | Mullins | 137/318 |
| 3,564,956 | 2/1971 | Landen | 81/126 |
| 3,657,948 | 4/1972 | Myers | 81/367 |
| 3,698,419 | 10/1972 | Tura | 137/318 |
| 4,112,944 | 9/1978 | Williams | 222/83 X |
| 4,522,339 | 6/1985 | Costa | 137/318 X |
| 4,538,485 | 9/1985 | Saila | 81/336 |
| 4,889,021 | 12/1989 | Morrison | 81/325 |
| 4,893,530 | 1/1990 | Warheit | 81/409.5 |
| 5,022,253 | 6/1991 | Parlatore | 30/366 X |
| 5,291,914 | 3/1994 | Bares et al. | 222/5 X |
| 5,301,532 | 4/1994 | Bickmore et al. | 137/318 X |

FOREIGN PATENT DOCUMENTS 23040  11/1901  United Kingdom ................. 30/366

*Primary Examiner*—Kevin P. Shaver
*Attorney, Agent, or Firm*—Michael J. Colitz, Jr.

[57] ABSTRACT

Refrigerant discharge pliers for removing refrigerant from the lines of refrigeration systems comprising a first rigid bar having a handle formed on one end and a lower jaw formed on the other end. A second rigid bar having a handle formed on one end and an upper jaw formed on the other end. A pivotal mechanism for coupling the jaws and allowing one bar to pivot with respect to the other. A spacer mechanism coupled between the handles for biasing the jaws. A positioning mechanism coupled to the jaws for holding and positioning a line. A piercing mechanism coupled to jaws for piercing a line held by the positioning mechanism, and a discharge mechanism coupled to the piercing mechanism for draining a pierced line held by the positioning mechanism.

3 Claims, 3 Drawing Sheets

REFRIGERANT DISCHARGE PLIERS

BACKGROUND OF THE INVENTION

1. Field of the Invention

The present invention relates to refrigerant discharge pliers and more particularly pertains to removing refrigerant from the lines of refrigeration systems with refrigerant discharge pliers.

2. Description of the Prior Art

The use of pliers and clamping devices is known in the prior art. More specifically, pliers and clamping devices heretofore devised and utilized for the purpose of removing refrigerant from refrigeration systems are known to consist basically of familiar, expected and obvious structural configurations, notwithstanding the myriad of designs encompassed by the crowded prior art which have been developed for the fulfillment of countless objectives and requirements.

By way of example, patents containing components generally related to the present invention are Landen U.S. Pat. No. 3,564,956 which discloses a locking plier wrench; Myers U.S. Pat. No. 3,657,948 which discloses a locking plier; Saila U.S. Pat. No. 4,538,485 which discloses a lockable plier tool; Morrison U.S. Pat. No. 4,889,021 which discloses a clamping plier with locking means; and Warheit U.S. Pat. No. 4,893,530 which discloses a plier-type tool.

While these devices fulfill their respective, particular objective and requirements, the aforementioned patents do not describe refrigerant discharge pliers that clamp and lock onto refrigerant lines for piercing, pierce refrigerant lines for subsequent draining, and allow an external recovery system to be coupled thereto for collecting of refrigerant.

In this respect, the refrigerant discharge pliers according to the present invention substantially departs from the conventional concepts and designs of the prior art, and in doing so provides an apparatus primarily developed for the purpose of removing refrigerant from the lines of refrigeration systems.

Therefore, it can be appreciated that there exists a continuing need for new and improved refrigerant discharge pliers which can be used for removing refrigerant from the lines of refrigeration systems. In this regard, the present invention substantially fulfills this need.

SUMMARY OF THE INVENTION

In the view of the foregoing disadvantages inherent in the known types of clamping devices now present in the prior art, the present invention provides improved refrigerant discharge pliers. As such, the general purpose of the present invention, which will be described subsequently in greater detail, is to provide new and improved refrigerant discharge pliers and a method which have all the advantages of the prior art and none of the disadvantages.

To attain this, the present invention essentially comprises, in combination, a first rigid bar having a handle formed on one end, a lower jaw formed on the other end, and an aperture disposed thereon between the ends, and a second rigid bar having a handle formed on one end, an upper jaw formed on the other end, and an aperture disposed thereon between the ends. A bolt extends through the apertures forming an axis of rotation between the first and second bar, thus allowing one bar to pivot with respect to the other. An adjustable and resilient spacer biases the two rigid bars about the bolt to define a configuration having opposed and spaced upper and lower jaws on one end and opposed and spaced handles on the other end. The spacer further comprises a third bar having a first end pivotally coupled to the first bar between the handle and the bolt and a second end extended in a curvature towards the second bar. The second end has a plurality of teeth formed thereon. A spring is included and has one end coupled to the first bar and the other end coupled to the third bar between the first and second ends for urging the third bar towards the first bar. A locking lever is rotatably coupled to the second bar between the handle and the bolt with the locking lever having a cam on one end and a handle on the other end. The handle has one orientation for abutting the cam against the teeth, whereby locking the jaws at a set position, and another orientation for releasing the cam from the teeth, whereby unlocking the jaws from a set position. A plurality of discharge mechanisms is included are coupled to and formed in the jaws for holding, puncturing, and draining refrigerant from the lines of refrigeration systems when clamped thereon, each discharge mechanism further comprising a pair of opposed semi-circular cutouts creating a seat for holding a refrigerant line therein with each cut-out formed on a jaw. A pair of opposed gaskets is included for holding tubing therebetween in a stationary position. Each gasket is disposed in and coupled to a jaw. A bored housing is coupled to the upper jaw for puncturing and draining refrigerant from refrigerant lines placed between the jaws. The housing further includes a threaded cylinder having a hollow core with a top end and a bottom end. A needle is disposed within the core and extending from the bottom end into the space between the gaskets. The needle has an unbiased position when not engaged in piercing, whereby preventing communication therearound to the core, and a biased position when engaged in piercing, whereby allowing communication therearound to the core. An elongated ball-check valve is disposed within the core with the ball-check valve having a detent positioned at the bottom end in contact with the needle. The detent allows communication therearound when in a biased position toward the top end by a biased needle. A ball is positioned at the top end. The ball allows communication therearound when placed in a biased position toward the bottom end by an external pin of a cable connector. The device includes a spring for urging the detent towards the bottom end and the ball towards the top end when the needle is placed in an unbiased position, whereby placing the ball-check valve in an unbiased position, thus preventing communication through the core. A cap is threadably coupled to the cylinder for preventing communication through the top end of core when the needle is placed in either a biased or an unbiased position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved refrigerant discharge pliers which have all the advantages of the prior art clamping devices and none of the disadvantages.

It is another object of the present invention to provide new and improved refrigerant discharge pliers which may be easily and efficiently manufactured and marketed.

It is a further object of the present invention to provide new and improved refrigerant discharge pliers which is of durable and reliable construction.

An even further object of the present invention is to provide new and improved refrigerant discharge pliers which is susceptible of a low cost of manufacture with regard to both materials and labor, and which accordingly is then susceptible of low prices of sale to the consuming public, thereby making such a refrigerant discharge pliers economically available to the buying public.

Still yet another object of the present invention is to provide new and improved refrigerant discharge pliers which provides in the apparatuses and methods of the prior art some of the advantages thereof, while simultaneously overcoming some of the disadvantages normally associated therewith.

Even still another object of the present invention is to provide new and improved refrigerant discharge pliers for removing refrigerant from the lines of refrigeration systems.

Lastly, it is an object of the present invention to provide new and improved refrigerant discharge pliers comprising a first rigid bar having a handle formed on one end and a lower jaw formed on the other end; a second rigid bar having a handle formed on one end and an upper jaw formed on the other end; pivotal means for coupling the jaws and allowing one bar to pivot with respect to the other; spacer means coupled between the handles for biasing the jaws; positioning means coupled to the jaws for holding and positioning a line; piercing means coupled to jaws for piercing a line held by the positioning means; and discharge means coupled to the piercing means for draining a pierced line held by the positioning means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
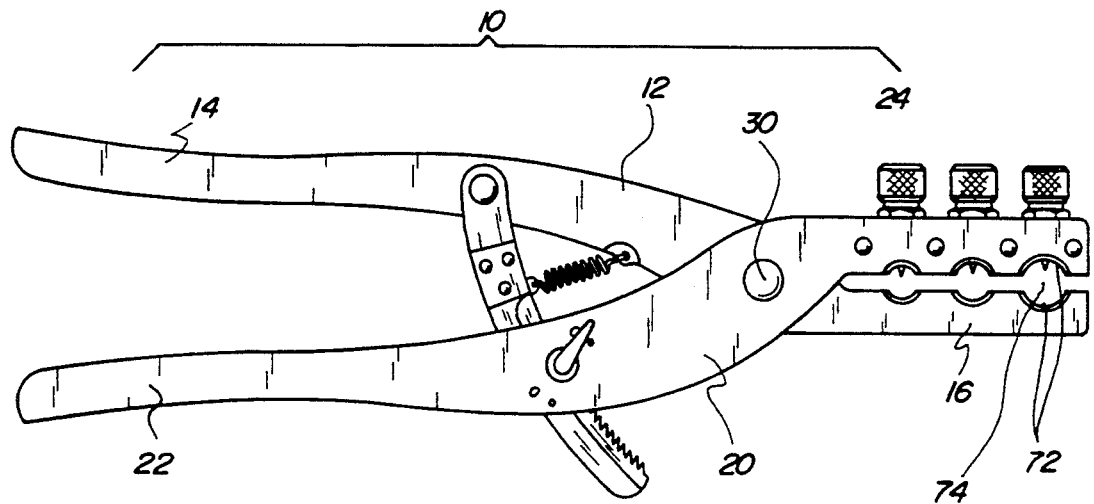
FIG. 1 is a side elevational view of the preferred embodiment of the refrigerant discharge pliers constructed in accordance with the principles of the present invention.
Figure 2:
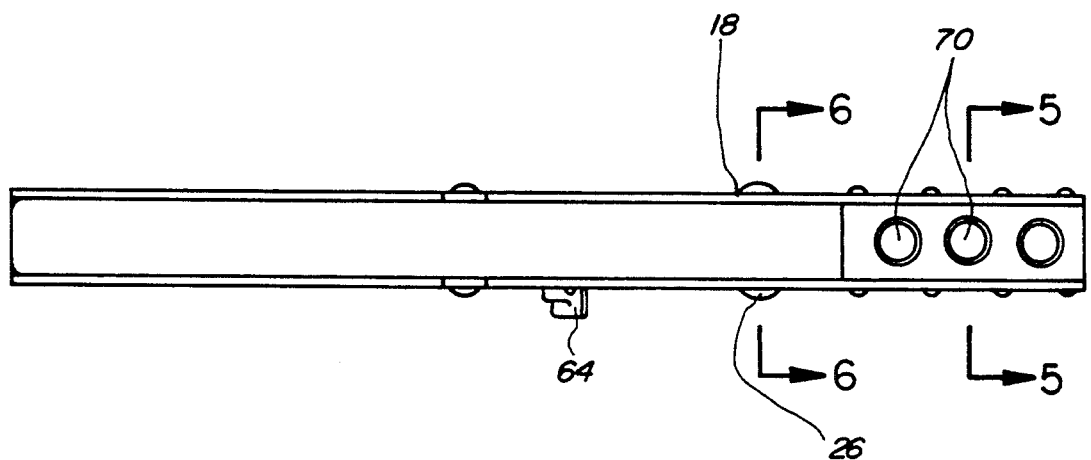
FIG. 2 is a plan view of the refrigerant discharge pliers of FIG. 1.
Figure 3:
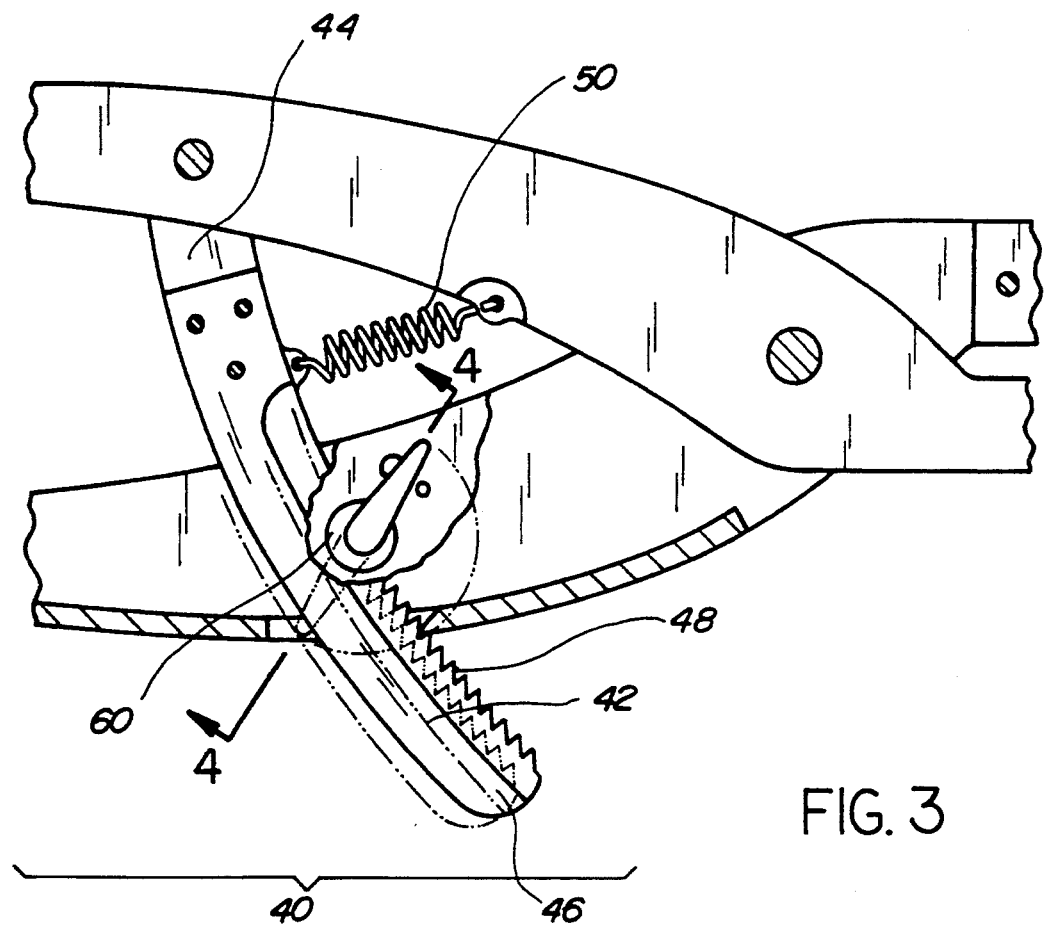
FIG. 3 is a enlarged cross sectional view of the spacer means of the present invention.
Figure 4:
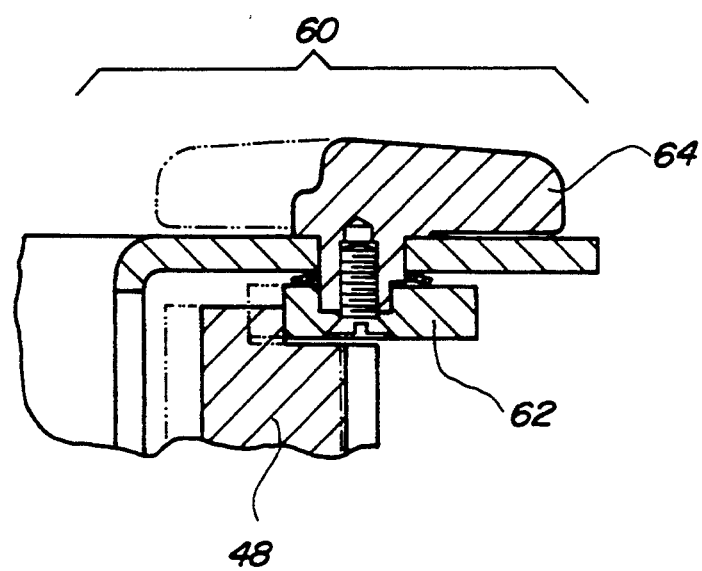
FIG. 4 is a cross sectional view of the coupling between the locking lever and the spacer taken along the line 4—4 of FIG. 3.
Figure 5:
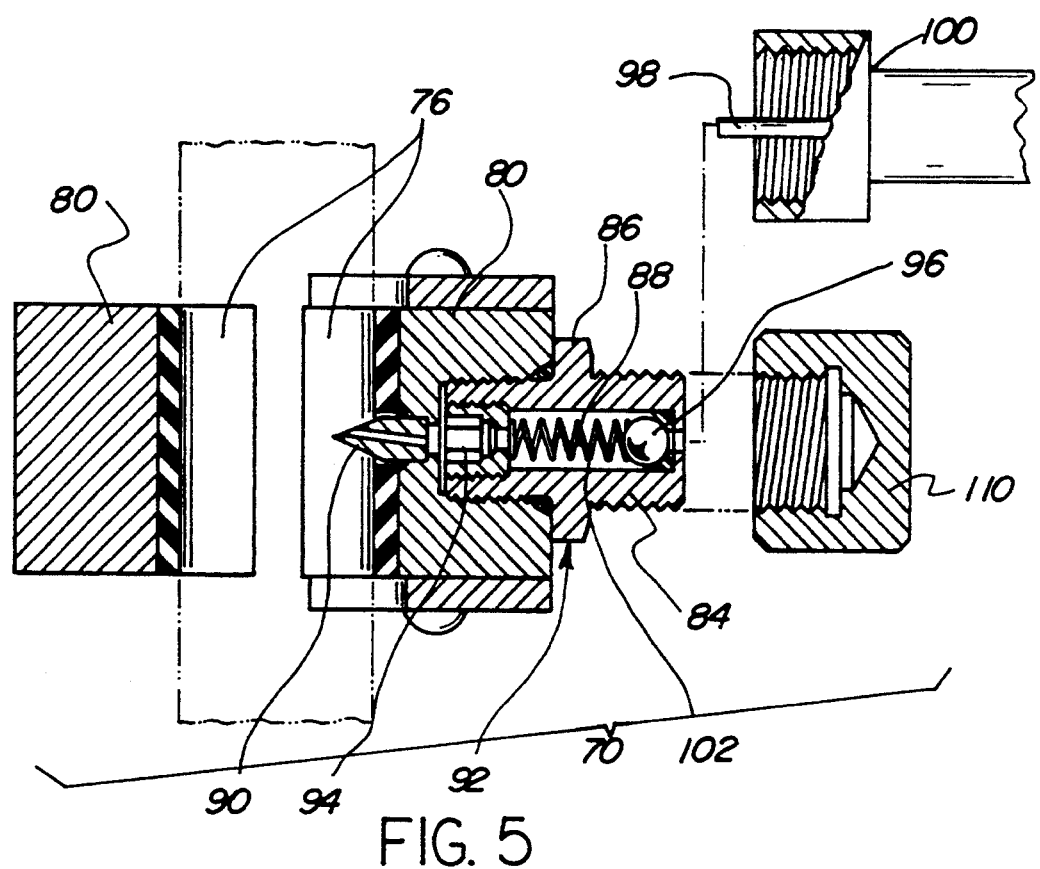
FIG. 5 is a cross sectional view of the mechanism used to pierce and drain refrigerant from a refrigerant line taken along the line 5—5 of FIG. 2.
Figure 6:
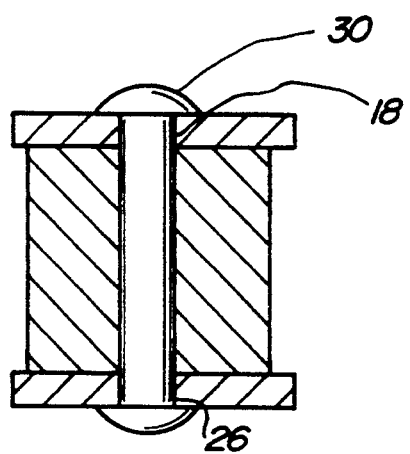
FIG. 6 is a cross sectional view of the mechanism used to couple the bars of the pliers together taken along the line 6—6 of FIG. 2.

With reference now to the drawings, and in particular, to FIG. 1 thereof, the preferred embodiment of the new and improved refrigerant discharge pliers embodying the principles and concepts of the present invention and generally designated by the reference number 10 will be described.

Specifically, the present invention includes four major components. The major components are the bars, bolt, spacer, and discharge mechanisms. These components are interrelated to provide the intended function.

More specifically, it will be noted in the various Figures that the first major component is the bars. The device includes a first rigid bar and a second rigid bar. The first rigid bar 12 has a handle 14 formed on one end, a lower jaw 16 on the other end, and an aperture 18 disposed thereon between the ends. The second bar 20 has a handle 22 formed on one end, an upper jaw 24 on the other end, and an aperture 26 disposed thereon between the ends.

The second major component is the bolt 30. The bolt extends through the apertures 18, 26 of the bars. The bolt forms an axis of rotation between the first bar 12 and the second bar 20. This allows one bar to pivot with respect to the other.

The third major component is the spacer 40. The spacer is adjustable and resilient in structure. The spacer biases the two rigid bars 12, 20 about the bolt 30 to define a configuration having opposed and spaced upper and lower jaws 16, 24 on one end and opposed and spaced handles 14, 22 on the other end.

The spacer further comprises a third bar 42. The third bar has a first end 44 pivotally coupled to the first bar 12 between the handle 14 and the bolt 30. The third bar also has a second end 46 extended in a curvature towards the second bar 20. The second end has a plurality of teeth 48 formed thereon.

Furthermore, the spacer also includes a spring 50. The spring has one end coupled to the first bar 12 and the other end coupled to the third bar 42 between the first and second ends. The spring is used to urge the third bar towards the first bar.

The spacer also includes a locking lever 60. The lever is rotatably coupled to the second bar 20 between the handle 22 and the bolt 30. The locking lever has a cam 62 on one end and a handle 64 on the other end. The handle has one orientation for abutting the cam against the teeth 48, whereby locking the jaws 16, 24 at a set position. The handle also has another orientation for releasing the cam from the teeth, whereby unlocking the jaws from a set position.

The fourth major component is the discharge mechanisms 70. A plurality of discharge mechanisms are coupled to and formed in the jaws 16, 24. They are used for holding, puncturing, and draining refrigerant from the lines of refrigeration systems when clamped thereon.

Each discharge mechanism has a pair of opposed semi-circular cutouts 72. The cut-outs are formed in the jaws. The cutouts create a seat 74 for holding a refrigerant line therein.

Each discharge mechanism also includes a pair of opposed gaskets 76. The gaskets are coupled within the jaw. The gaskets are used to hold tubing therebetween in a stationary position and prevent leakage therefrom when pierced.

Each discharge mechanism also includes a housing 80. The housing is coupled to the upper jaw 24. The housing has a top end, a bottom end, and a bore 82 therethrough. The housing is adapted to hold a valve therein for puncturing and draining refrigerant from refrigerant lines placed between the jaws.

The housing includes a threaded cylinder 84. The cylinder is disposed within the bore 82. The cylinder has a threaded top end, a bottom end threadably coupled to the housing, and an outwardly extending lip 86 therebetween. The cylinder has a hollow core 88.

A needle 90 is disposed within the bore 82 and extends therefrom to a position between the gaskets 76. The needle has an unbiased position when not engaged in piercing, whereby preventing communication therearound to the core 88. The needle also has a biased position when engaged in piercing, whereby allowing communication therearound to the core.

Furthermore, each discharge mechanism includes an elongated ball-check valve 92. The ball-check valve has a top end and a bottom end. The ball-check valve is disposed within the core 88. The ball-check valve has a detent 94 positioned at the bottom end in contact with the needle 90. The detent allows communication therearound when in a biased position toward the top end by a biased needle. The ball-check valve also includes a ball 96. The ball is positioned at the top end and allows communication therearound when placed in a biased position toward the bottom end by an external pin 98 of a cable connector 100.

Furthermore, the ball-check valve also includes a spring 102. The spring is disposed between the detent 94 and the ball 96. The spring is used for urging the detent towards the bottom end and the ball towards the top end of the ball-check valve when the needle is placed in an unbiased position. This places the ball-check valve in an unbiased position, and prevents communication through the core 88.

A second embodiment includes essentially all of the components of the first embodiment further including a cap 110. The cap is threadably coupled to the top end of the cylinder 84. The cap is used to prevent communication around the needle and through the core 88 when the needle is placed in either a biased or an unbiased position. The cap is usually utilized to protect the top end of the ball-check valve and to insure leakage does not occur when an external connector of a refrigerant evacuation system is not coupled to the ball-check valve.

In the preferred embodiment, the major components are formed of steel or any other rigid material. The seats within the jaws are formed with a ¼ inch, 5/16 inch, and ⅜ inch diameters. Metric sizes can also be used. The discharge mechanism is adapted to be coupled to an air conditioner hose of a pump recovery system. The present invention would be used to drain refrigerant from lines such as those in air conditioners, ice boxes, refrigerators or freezers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. Refrigerant discharge pliers for removing refrigerant from the lines of refrigeration systems comprising:
   a first rigid bar having a handle formed on one end and a lower jaw formed on the other end;
   a second rigid bar having a handle formed on one end and an upper jaw formed on the other end;
   pivotal means for coupling the jaws and allowing one bar to pivot with respect to the other;
   spacer means coupled between the handles for biasing the jaws;
   positioning means coupled to the jaws, the positioning means adapted for holding and positioning a line;

piercing means coupled to jaws, the piercing means adapted for piercing a line held by the positioning means; and discharge means coupled to the piercing means, the discharge means adapted for draining a pierced line held by the positioning means.

2. The device as set forth in claim 1 further including securement means coupled to the spacer means for locking and unlocking the jaws.

3. Refrigerant discharge pliers for removing refrigerant from the lines of refrigeration systems comprising, in combination:

a rigid first bar having a handle formed on one end, a lower jaw formed on the other end, and an aperture disposed thereon between the ends;

a rigid second bar having a handle formed on one end, an upper jaw formed on the other end, and an aperture disposed thereon between the ends;

a bolt extending through the apertures forming an axis of rotation between the first and second bar, thus allowing one bar to pivot with respect to the other;

an adjustable and resilient spacer biasing the two rigid bars about the bolt to define a configuration having opposed and spaced upper and lower jaws on one end and opposed and spaced handles on the other end, the spacer further comprising:

a third bar having a first end pivotally coupled to the first bar between the handle and the bolt and a second end extended in a curvature towards the second bar, the second end having a plurality of teeth formed thereon;

a spring having one end coupled to the first bar and the other end coupled to the third bar between the first and second ends for urging the third bar towards the first bar; and a locking lever rotatably coupled to the second bar between the handle and the bolt, the locking lever having a cam on one end and a handle on the other end, the handle having one orientation for abutting the cam against the teeth, whereby locking the jaws at a set position, and another orientation for releasing the cam from the teeth, whereby unlocking the jaws from a set position;

a plurality of discharge mechanisms coupled to and formed in the jaws for holding, puncturing, and draining refrigerant from the lines of refrigeration systems when clamped thereon, each discharge mechanism further comprising:

a pair of opposed semi-circular cutouts creating a seat adapted for holding a refrigerant line therein with each cut-out formed on a jaw;

a pair of opposed gaskets adapted for holding and preventing leakage of a refrigerant line disposed therebetween, each gasket disposed in and coupled to a jaw;

a housing coupled to the upper jaw, the housing having a top end, a bottom end, and a bore therebetween;

a cylinder having a hollow core with a threaded top end, a bottom end threadably coupled to the housing, and an outwardly extending lip therebetween;

a needle disposed within the bore and extending from the bottom end into the space between the gaskets, the needle having an unbiased position when not engaged in piercing, whereby preventing communication therearound to the core, and a biased position when engaged in piercing, whereby allowing communication therearound to the core; and an elongated ball-check valve disposed within the core, the ball-check valve having a detent positioned at the bottom end in contact with the needle, the detent allowing communication therearound when in a biased position toward the top end by a biased needle, a ball positioned at the top end, the ball allowing communication therearound when placed in a biased position toward the bottom end, and a spring therebetween for urging the detent towards the bottom end and the ball towards the top end when the needle is placed in an unbiased position, whereby placing the ball-check valve in an unbiased position, thus preventing communication through the core; and a cap threadably coupled to the cylinder for preventing communication through the top end of the core when the needle is placed in either a biased or an unbiased position.

* * * * *